Sept. 4, 1951            E. YELLIN            2,566,817
MOLD FOR MAKING PLASTIC GRIDS
Filed Dec. 9, 1948            4 Sheets-Sheet 1
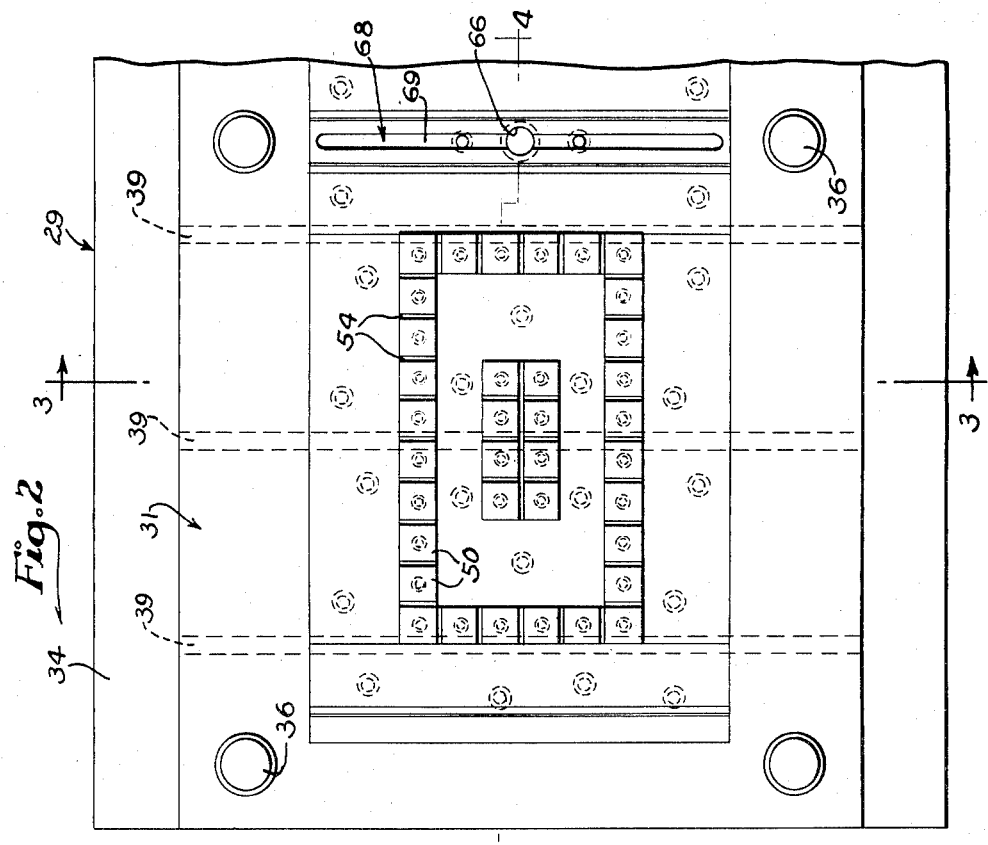
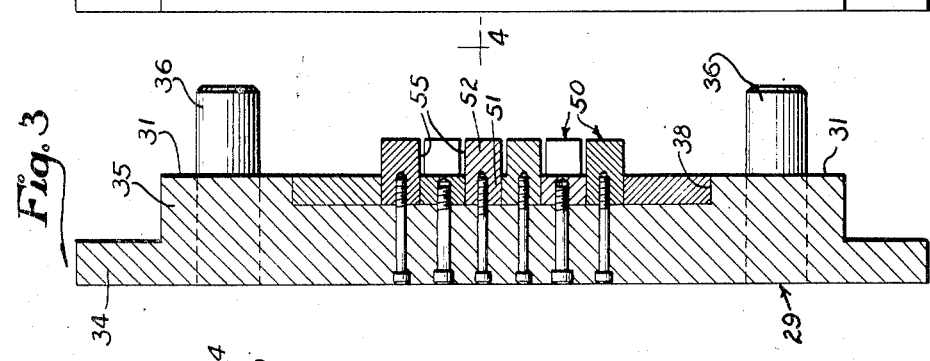
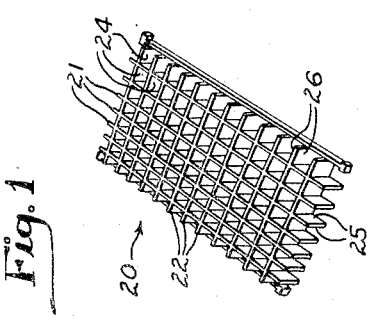
INVENTOR.
Edward Yellin
BY
Carlson, Pitzner, Hubbard & Wolfe
Attys.

Sept. 4, 1951   E. YELLIN   2,566,817
MOLD FOR MAKING PLASTIC GRIDS
Filed Dec. 9, 1948   4 Sheets-Sheet 2
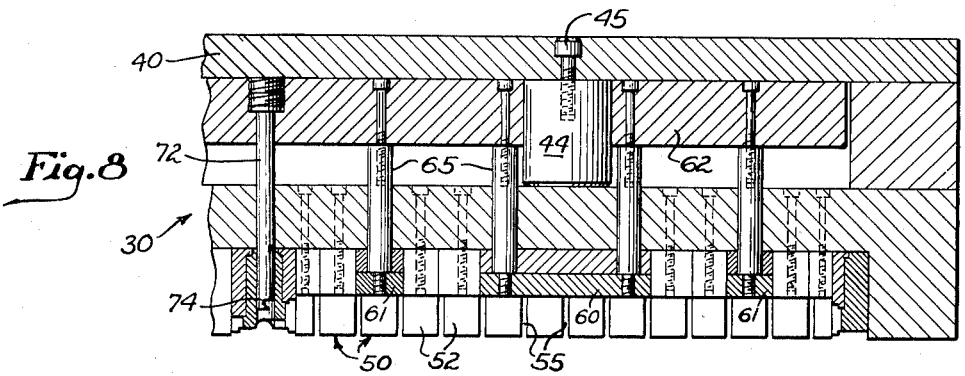
INVENTOR.
Edward Yellin
BY
Carlson, Pitzner, Hubbard & Wolfe
Attys

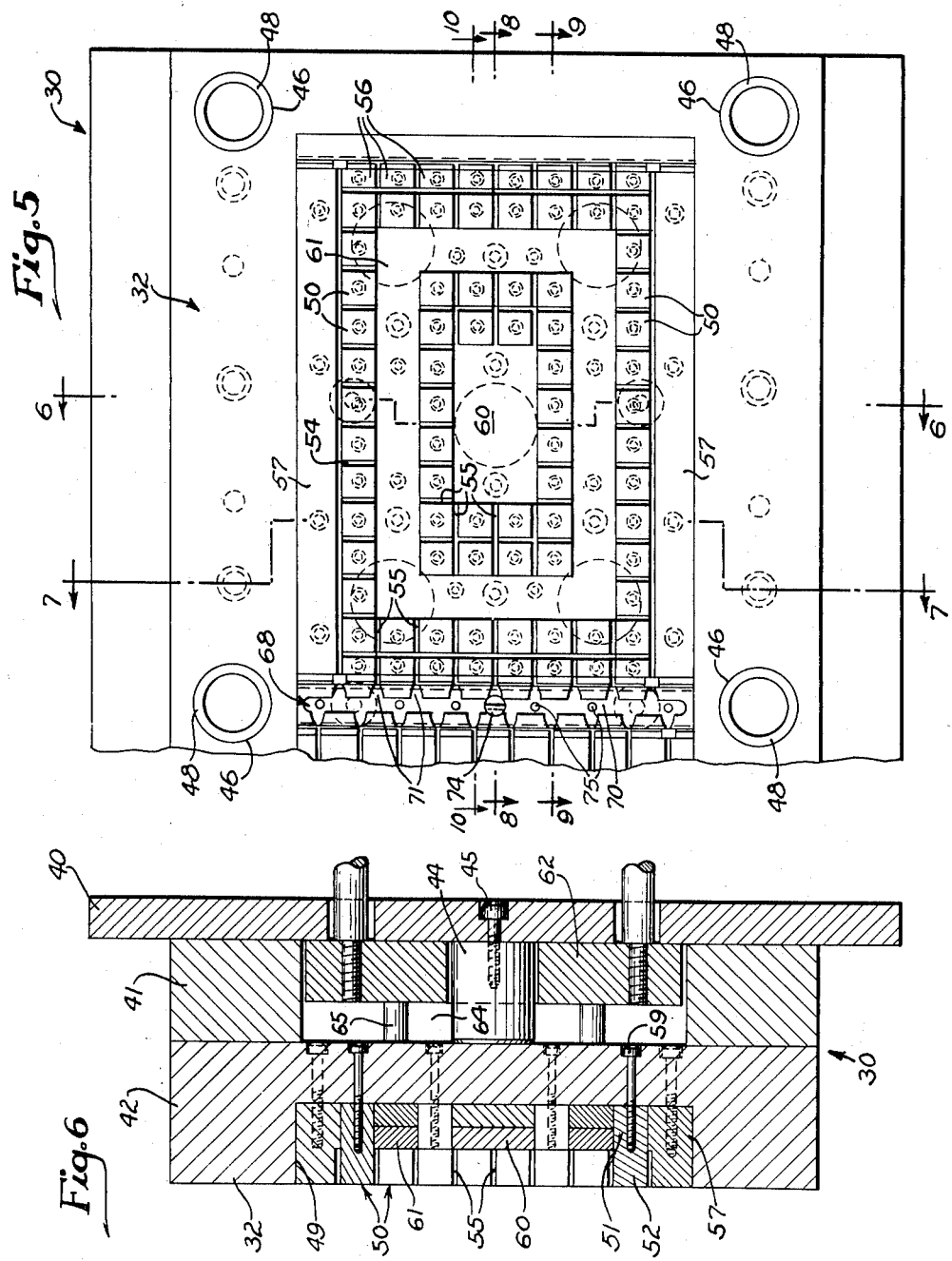

INVENTOR.
Edward Yellin
BY
Carlson, Pitzner, Hubbard & Wolfe
attys.

Patented Sept. 4, 1951

2,566,817

UNITED STATES PATENT OFFICE 2,566,817

MOLD FOR MAKING PLASTIC GRIDS

Edward Yellin, Chicago, Ill., assignor, by mesne assignments, to Leader Electric Company, Chicago, Ill., a corporation of Illinois Application December 9, 1948, Serial No. 64,353

10 Claims. (Cl. 18—42)

The present invention relates generally to the plastic molding art and more specifically to a novel mold having particular, but by no means exclusive, utility in connection with the molding of thermoplastic materials.

One object of the invention is to provide a novel and economical mold for producing an integral plastic grid or lattice work refined by a plurality of intersecting ribs disposed in generally perpendicular relation to the plane of the grid.

Another object is to provide a mold of the character set forth and which will be capable of forming an integral plastic grid having light diffusion properties and substantially identical side faces.

A further object is to provide a mold for fashioning a plastic grid or lattice work of the above type and having relatively thin sidewalls of substantially constant thickness. A more specific object is to provide a mold for forming a grid of the character set forth and comprising two perpendicular sets of ribs, those in either set being substantially parallel to each other.

Other objects and advantages will become apparent as the following detailed description proceeds, taken in connection with the accompanying drawings, wherein:

Figure 1 is a perspective view of an illustrative plastic grid fashioned by the use of a mold embodying the present invention.

Fig. 2 is an enlarged fragmentary elevation of the face of one complemental member of the mold.

Fig. 3 is a vertical sectional view through that portion of the mold shown in Fig. 2, such view being taken in the plane of the line 3—3.

Fig. 4 is a horizontal sectional view through that portion of the mold shown in Fig. 2, such view being taken in the plane of the line 4—4.

Fig. 5 is an enlarged fragmentary elevation of the face of the second complemental member of the mold.

Fig. 6 is a vertical sectional view through that portion of the mold shown in Fig. 5, such view being taken in the plane of the line 6—6.

Figs. 8 and 9 are horizontal sectional views through that portion of the mold shown in Fig. 5, such views being taken respectively in the planes of the lines 8—8 and 9—9.

Fig. 10 is a fragmentary horizontal sectional view through the mold with its respective complemental members in abutment and ready to receive a charge of material, such view being taken in the general plane indicated by the line 10—10 in Fig. 5.

Figure 7:
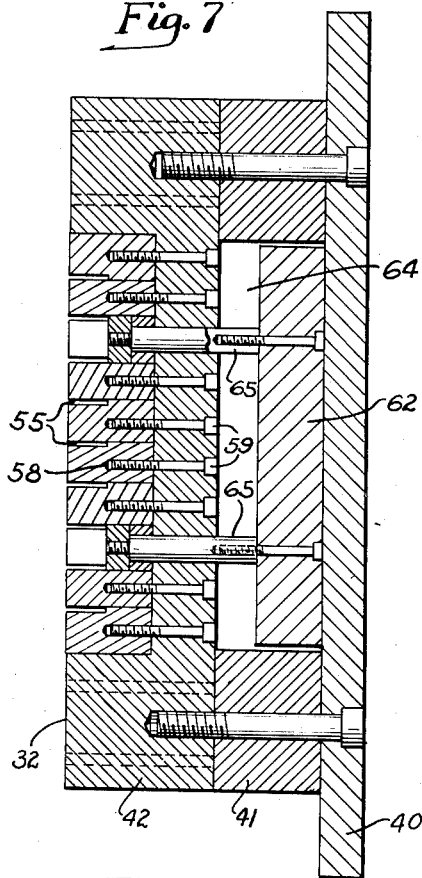
Fig. 7 is a view similar to Fig. 6 but taken in the plane of the line 7—7 of Fig. 5.
Figure 11:
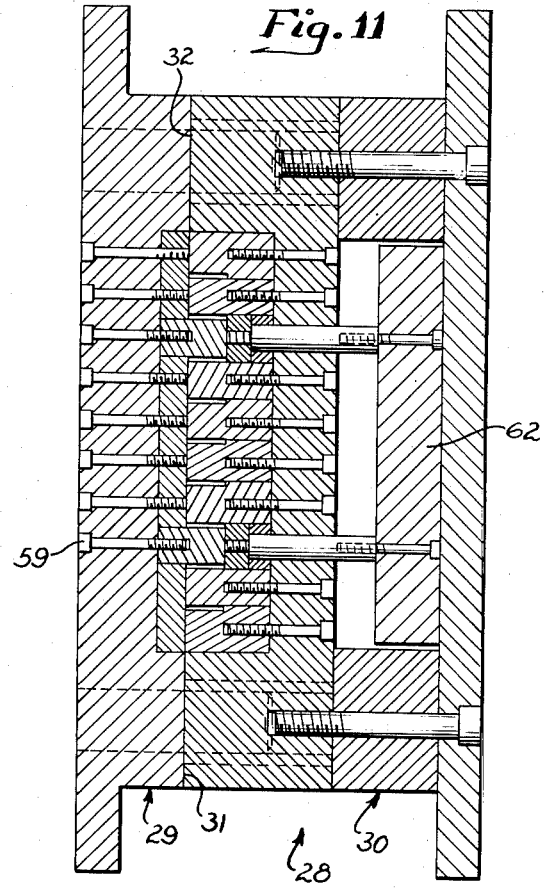

Fig. 11 is a vertical sectional view through the mold with the same in the condition illustrated in Fig. 10, such view being taken in the general plane indicated by the line 7—7 in Fig. 5.

Figure 12:
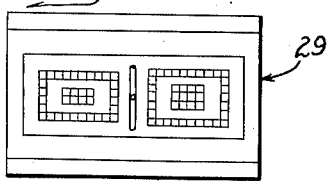
Figure 13:
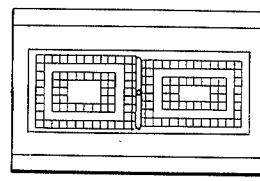

Figs. 12 and 13 are diagrammatic views showing the complete face of each half of the mold.

Figure 14:
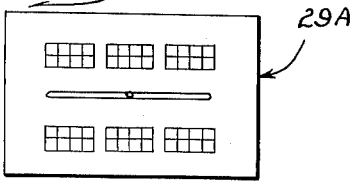
Figure 15:
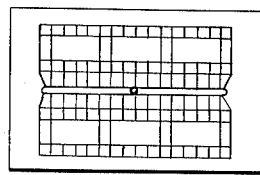

Figs. 14 and 15 are views similar to Figs. 12 and 13 but illustrating generally a slightly modified form of mold.

While the invention is susceptible of various modifications and alternative constructions, I have shown in the drawings and will herein describe in detail a preferred embodiment. It should be understood, however, that I do not thereby intend to limit the invention to the specific form disclosed, but, on the contrary, my intention is to cover all modifications and alternative constructions falling within the spirit and scope of the invention as expressed in the appended claims.

Referring to Fig. 1, there is shown an integral plastic grid or lattice work 20 having light diffusion properties and formed by the use of an illustrative mold embodying the present invention. In the present instance, the grid 20 happens to be fashioned from a translucent thermoplastic material such as polystyrene. The grid 20 is defined by intersecting sets of rib portions 21, 22, lying generally perpendicular to its plane, the lateral edges of such rib portions constituting virtually identical opposed side faces on the grid. In this case, the rib portions of one set are substantially perpendicular with those of the other set, thereby defining a plurality of evenly spaced, generally rectangular interstices 24. Each of the rib portions 21 is fashioned with a relatively small and substantially constant thickness making its side faces 25 substantially parallel. By the same token, each of the rib portions 22 is of comparable thickness to the portions 21 and its side faces 26 are also substantially parallel. To enhance the light transmitting and reflecting ability of the grid 20, the side faces 25, 26 and lateral edges of the rib portions 21, 22 are fashioned with exceptionally smooth surfaces.

Turning more specifically to the drawings, the invention is there exemplified in an illustrative mold 28 adapted when in its closed position to receive a charge of heated thermoplastic material which is introduced thereinto under considerable pressure via appropriate inlet means.

To permit solidification and eventual ejection of the molded piece, the mold 28 is maintained at a fairly constant temperature in any suitable manner, such, for example, as by controlling the rate of flow of a cooling medium therethrough. The mold 28 comprises two complemental impression members or sections 29, 30 mounted for movement relative to each other and having tightly fitting faces 31, 32 which are disposed in sealing abutment as far as the molded material is concerned when the mold is in its closed position. Preferably, the mold 28 is set up in an injection press with the impression member 29 fixed in place and the impression member 30 movable and actuated by the plunger of the press.

In the form shown, the mold 28 is of the duplex type and is capable of producing two grids simultaneously, each of the impression members 29, 30 having two sets of impression forming elements disposed side by side. Due to the substantial similarity of such sets of elements, a description of one set will suffice for both and the discussion herein will be confined primarily to one side only of each impression member, together with an arrangement for introducing material into the mold cavity.

The fixed impression member 29 (Figs. 2, 3 and 4) is organized upon a mounting shoe 34 of generally rectangular shape adapted to be secured in a molding press by any suitable fastening means. Integral with the shoe 34 is a raised spacer portion 35 terminating in a precisely and smoothly machined hollow rectangular surface which constitutes the sealing face 31. Located in spaced apart and outwardly projecting relation upon the face 31 are a plurality of guide or liner pins 36 of fairly large diameter. The pins 36 are of course rigidly fixed to the shoe 34 and serve to engage corresponding bores in the movable impression member 30 so as to insure registration between the impression members as the same are brought together during the molding operation. Centrally located within the rectangular face 31 is a retaining recess 38 within which are mounted the impression producing means carried by the impression member 29. Running vertically through the shoe 34 and arranged in spaced apart parallel relation are a series of cooling passages 39 through which a controlled flow of water is maintained, thereby keeping the mold at a constant temperature.

Upon reference to Figs. 5 to 9, it will be perceived that the movable impression member 30 is organized upon the mounting shoe 40 of generally rectangular shape and which may be attached in any suitable manner to the movable platen of the molding press. Rigidly secured to the shoe 40 is a hollow rectangular spacer member 41, the latter in turn carrying a rigidly attached mold plate 42 which terminates in a smoothly and precisely machined hollow rectangular surface constituting the sealing face 32 of the movable impression member. To prevent outward bulging of the central portion of the mold plate 42 as a result of injection pressure within the mold, there is interposed between the shoe 40 and the plate 42 a central supporting pillar or column 44 fixed to the shoe 40 as by means of a cap screw 45. To receive the guide pins 36 of the fixed mold half 29, the mounting plate 42 is provided with a series of bores 46 disposed at proper intervals along the face 32 for proper registration with the pins 36, the bores 46 having bushings 48 of suitable size to receive the pins 36 with a comfortable sliding fit. Located within the sealing face 32 is a generally rectangular recess 49 within which is mounted the impression forming means carried by the movable impression member 30.

Means is provided for defining within the mold 28 a labyrinth cavity in the shape of the grid 20 and from which the molded piece may readily be extracted without deformation of the same. This is accomplished by the use of a plurality of closely spaced core elements on the respective impression members 29, 30, each such core element projecting across the mold cavity and having a flat end face susceptible of abutment with the opposite cavity wall upon closure of the mold. In the present instance, such core elements are in the form of generally rectangular mold blocks 50 each having a base portion 51 and a projecting portion 52 of slightly smaller cross section, the latter being defined by one or more transverse medial shoulders 54. The shoulders 54, being of uniform width, permit even spacing of the projecting portions 52 of the blocks when the latter are arranged with their base portions in abutment. This defines within the mold a network of intersecting passages 55 corresponding in shape to the rib portions 21, 22. The projecting portion 52 of each of the blocks 50 is preferably fashioned with the barest minimum of draft or taper in the direction away from its base portion 51. For example, in a block with an end portion slightly less than 1″ in cross section and about ⅞″ deep, the taper along any side face from the shoulder 54 to the outer end of the block might run as little as $5/1000$ of an inch. In addition to the blocks 50, there is also provided a series of fractional blocks 56 to define the fractional spaces between the rib portions 21 along the two narrow sides of the grid 20. The blocks 56 resemble the blocks 50, in most respects, having the same taper on those faces adjacent the projecting portions of the blocks 52 but having no taper on those sides which abut against the mold plate or spacers 57 associated therewith.

In furtherance of the foregoing objective, the core elements or blocks 50, 56 are distributed between the impression members of the mold, a substantial number being mounted in a given pattern within the recess 38 of the fixed member 29 and the remainder being mounted in a complementary pattern within the recess 49 of the movable member 30. This arrangement defines an unobstructed portion on the mold cavity wall of each impression member 29, 30 corresponding in shape to the pattern of core elements on the opposite one of such members, the core elements of each such member being located outside the bounds of its unobstructed cavity wall portion. Upon closure of the mold, the end of each of the core elements abuts along its entire perimeter against the unobstructed cavity wall portion of the opposite impression member. For mounting purposes, the base portion of each of the blocks 50, 56 is provided with a tapped hole 58 which is threadedly engaged by a cap screw 59 passing through the mold plate.

To facilitate ejection of the molded pieces, consideration is given to the arrangement and distribution of the blocks 50, 56 between the mold members 29, 30. Accordingly, the impression member 30 is provided in this instance with substantially more of the mold blocks 50 than the impression member 29 and, in addition, carries all the fractional blocks 56. This arrangement causes the molded pieces to adhere to the impression member 30, which is movable, rather than to the fixed impression member 29 when these members part, thereby effectively extracting the grid from the fixed impression member as an incident to opening of the mold. Such action also causes the molded piece to "relax" somewhat its hold on the impression member 30, facilitating ejection of the molded grid 20 from the latter. For the purpose of allowing the molded grid 20 to be ejected or stripped from the movable impression member 30 without deforming or otherwise marring the grid, the mold blocks 50 are arranged so as to leave two unobstructed portions or areas of considerable size on the mold cavity wall of the movable impression member. In the present instance, one such area is defined by a generally rectangular stripper plate 60 coextensive therewith. The other area happens in this case to be situated in spaced apart, surrounding relation with the first area, being defined by a second stripper plate 61 of hollow rectangular shape and coextensive with such area. When the impression members of the mold are together, the stripper plates 60, 61 are in their retracted position wherein they abut the flat end faces of the mold blocks mounted on the fixed mold member 29 along the entire perimeter of each such block. When the mold impression members separate, however, the stripper plates 60, 61 are moved into their extended position, at the same time applying symmetrically distributed forces over a wide area of the molded grid 20 and extracting the same from the movable mold member 30 without marring the grid.

To actuate the stripper plates 60, 61, there is housed within the mold impression member 30 a reciprocable ejector plate 62 (Figs. 6 and 7) which, in turn, may be actuated by means of an ejector rod or plunger (not shown). The plate 62 is adapted to move within a recess 64 defined within the spacer plate 41. Rigidly fixed to the plate 62 and also to the stripper plates 60, 61 are a plurality of ejector studs 65 adapted to slide within suitable bores in the mold plate 42 and to transmit the necessary actuating thrust to the stripper plates.

To admit thermoplastic material at molding temperature into the mold 28, the same is provided with inlet means which in this instance comprises a sprue opening 66 (Figs. 2 and 4) in the impression member 29. The opening 66 communicates with a runner cavity 68 defined by a pair of registered vertical grooves 69, 70 located on the respective molding faces of the impression members and having a length almost equal to the shorter dimension of the grid 20. Communicating with the runner groove 70 on the movable mold member are a plurality of gate passages 71, one such gate being provided for each of the horizontal passages 55 which corresponds to one of the longer rib portions 21 of the grid 20. In operation, with the mold in the closed position and with the mold impression members in proper registration as indicated in Figs. 10 and 11, thermoplastic material is forced from the runner cavity 68 via the gates 71 and into each of the horizontally disposed passages 55. As the latter fill up, material from the horizontally disposed passages 55 is forced into the vertically disposed ones of the passages 55, eventually welding together and forming an integral grid which solidifies to the necessary extent to permit extraction of the same from the mold.

While the material in the runner, gate and sprue passages is eventually severed from the grid 20, it must be treated as a portion of the grid for purposes of extraction from the mold. Accordingly, there is provided in the movable mold member 30 a sprue puller 72 which may be of somewhat conventional form, comprising an elongate shank rigidly secured to the ejector plate 62 and having an undercut groove 74 adjacent its outer end. The groove 74 fills with plastic during the molding operation and, when the mold members 29, 30 are separated, exerts sufficient force at the center of the runner to pull the sprue out of the sprue opening 66. Ejection of the runner and gates from the movable mold member 30 is coordinated with the stripping of the molded grid therefrom. This is accomplished by the simple expedient of mounting a series of ejector pins 75 on the ejector plate 62, the pins being arranged to contact the runner at evenly spaced intervals along its length so as to strip the runner and gate assembly at the same time the plates 60, 61 strip the molded piece.

In Figs. 14 and 15 there is shown the mating impression members 29A, 30A of a slightly modified mold 28A generally similar to the mold 28 but adapted to produce integral plastic grids of somewhat greater length and lesser width than the grid 20. The mold 28A is of the duplex type, the runner being horizontal rather than vertically disposed as in the mold 28.

I claim as my invention:

1. A mold for forming an integral plastic light diffusion grid having its walls of substantially uniform thickness and each lying generally perpendicular to the plane of said grid, said mold having inlet means for introducing plastic material thereinto, said mold comprising the combination of fixed and movable mold impression members having unequal numbers of generally rectangular mold blocks, each of the latter being spaced for defining one of the interstices of the grid, said blocks on one of said impression members being arranged in a pattern complementary with that of said blocks on another of said impression members, and a stripper plate carried by said member having the greater number of said blocks, said plate having a face area substantially coextensive with the pattern of the blocks of said impression member having the lesser number of said blocks.

2. A mold for forming an integral light diffusion grid of plastic material having its walls of substantially uniform thickness and all lying perpendicular to the plane of the grid, said mold having inlet means for introducing plastic material thereinto, said mold comprising, in combination, a pair of complemental sections disposed for movement relative to each other, a plurality of substantially uniform mold blocks fixed to one of said sections and spaced from each other by an amount substantially equal to the wall thickness of the grid, a greater number of similar mold blocks similarly fixed to the other of said sections, said blocks being arranged on said sections in complementary patterns susceptible of registration with each other upon closure of said mold, and stripper means carried by said other of said sections for applying ejection forces to the molded grid over an area substantially coextensive with the pattern of said mold blocks on said one section.

3. A mold for forming an integral plastic light diffusion grid defined by a plurality of intersecting rib portions lying substantially perpendicular to the plane of the grid, each of said rib portions having substantially parallel side faces, said mold having inlet means for the introduction of plastic material, said mold comprising, in combination, a first mold section having a fractional mold cavity therein defined by a number of mold blocks fixed thereto in a central cluster and a surrounding band separated from said cluster by an amount equal to the thickness of at least one of said blocks, adjacent ones of said blocks of both said cluster and said band having spaces therebetween substantially equal to the thickness of said rib portions, a second mold section complementary to said first section and having a fractional mold cavity therein defined by a substantially greater number of mold blocks fixed thereto in a pattern including a pair of concentric bands complementary to said cluster and band of said first mold section, adjacent ones of the blocks in the bands of said second mold section being spaced from each other by an amount substantially equal to the thickness of said rib portions, a pair of stripper plates slidably mounted on said second mold section, one of said stripper plates having a face area substantially coextensive with said cluster of blocks on said first mold section, the other of said stripper plates having a face area substantially coextensive with said band of blocks on said first mold section, and a common connecting means between said stripper plates for rendering them susceptible of actuation in unison upon separation of said mold sections.

4. A mold for forming an integral plastic light diffusion grid having its walls intersecting and all lying substantially perpendicular to the plane of the grid, each of said walls having substantially parallel side faces, said mold having inlet means for the introduction of plastic material and comprising the combination of a first mold section having a fractional mold cavity therein defined by a number of mold blocks fixed thereto in a cluster, adjacent ones of said blocks in said cluster having spaces therebetween substantially equal to the thickness of said walls, a second mold section complementary to said first section and having a fractional mold cavity therein defined by a substantially greater number of similar mold blocks fixed thereto in a continuous band, adjacent ones of the blocks in said continuous band being spaced from each other by an amount substantially equal to the thickness of said walls, and a stripper plate slidably mounted on said second mold section and having a face area substantially coextensive with said cluster of blocks on said first mold section.

5. An injection mold for forming from plastic material an integral light diffusion grid defined by intersecting ribs, each of the latter having substantially parallel side faces and lying substantially perpendicular to the general plane of the grid, said mold having inlet means for the introduction of plastic material, said mold comprising the combination of a first mold section, a marginal sealing face on said first mold section, a plurality of mold blocks distributed over the area within said marginal sealing face and rigidly secured to said first mold section, each of said blocks having at least one transverse medial shoulder defining therein a base portion and a projecting portion having a relatively slight taper away from said base portion, a second mold section also having a marginal sealing face, said mold sections being susceptible of relative motion therebetween, a plurality of similar mold blocks distributed over the area within the marginal sealing face of said second mold section in a pattern complementary with that of the blocks on said first mold section for interfitting with the same upon closing of said mold, said blocks on said second mold section having opposite taper and being greater in number than those on said first mold section, and stripper plates carried by said second mold section, said stripper plates having faces of appropriate shape to register with the ends of the blocks in said first mold section and thus define a portion of the wall of the mold cavity.

6. A mold for forming an integral plastic light diffusion grid having its walls of substantially uniform thickness and each lying generally perpendicular to the plane of the grid, said mold having inlet means for introducing plastic material thereinto, said mold comprising the combination of a first impression member having an unobstructed cavity wall portion, a second impression member susceptible of complemental abutting engagement with said first member, said second impression member also having an unobstructed cavity wall portion, a plurality of projecting elements fixed on said impression members outside the bounds of their respective unobstructed cavity wall portions and spaced for defining the interstices of the grid, one of said impression members having a greater number of projecting elements than the other of said members, each said projecting element having a relatively slight taper away from its corresponding impression member to provide a minimal draft, each said element also having side faces substantially perpendicular to the general plane of its impression member and terminating at the unobstructed cavity wall portion of the opposite impression member upon closure of said mold, and an ejector disposed for movement relative to said impression member having the greater number of said projecting elements, said ejector being rigidly connected to the unobstructed cavity wall portion of said impression member having the greater number of said projecting elements.

7. A mold for forming an integral light diffusion grid of plastic material having its walls of substantially uniform thickness and all lying perpendicular to the plane of the grid, said mold having inlet means for introducing plastic material and comprising, in combination, a pair of complemental impression members susceptible of movement relative to each other and each having a mold cavity wall therein, a plurality of minimal draft projections fixed in a pattern on one of said impression members, a greater number of similar projections fixed to the other of said impression members in a pattern complementary to said first pattern, said projections being of suitable length to abut against the cavity wall of the opposite one of said members upon closure of said mold, adjacent ones of said projections being disposed with opposed side faces spaced from each other by an amount substantially equal to the wall thickness of the grid, and stripper means mounted on said other of said impression members for applying substantially uniform ejection forces to the molded grid at a plurality of different points thereon.

8. In a mold for making an integral plastic light diffusion grid having opposed faces defined by the edges of intersecting ribs lying substantially perpendicular to the general plane of the grid, each said face having a substantially equal amount of open area representing the interstices of said grid, said mold having inlet means for introducing plastic material, the combination comprising a first mold impression member, a companion mold impression member, a plurality of spaced core elements disposed on said mold members and projecting outwardly therefrom for defining the interstices of the grid, the core elements on the respective impression members being arranged complementally, each of said spaced core elements having a minimal draft produced by a relatively slight taper toward its projecting end face, each of said core elements having a length sufficiently great to effect abutment between its projecting end face and the opposite one of said impression members upon closure of the mold.

9. In a mold for making from plastic material an integral light diffusion grid defined by intersecting ribs, each of the latter having substantially parallel side faces and lying generally perpendicular to the plane of the grid, said mold having inlet means for the introduction of plastic material thereinto, the combination comprising a first impression member, a second impression member, said members having means defining therebetween a mold cavity with a depth substantially equal to the width of the grid ribs measured perpendicular to the plane of the grid, a plurality of spaced core elements disposed on one of said impression members defining certain of the interstices of the grid, a plurality of similar core elements disposed in a complemental pattern on the other of said impression members for defining the remainder of the interstices of the grid, said core elements having opposed pairs of side faces tapered away from their respective impression members for a distance equal substantially to the depth of the mold cavity to provide minimal draft, the side faces of such opposed pairs being disposed in substantially parallel relation.

10. In a mold for making an integral light diffusion grid defined by intersecting ribs of plastic material, each such rib having substantially parallel side faces and lying generally perpendicular to the plane of the grid, said mold having inlet means for the introduction of the plastic material, the combination comprising a first impression member having a surface thereon for defining a portion of the mold cavity which is adapted to form certain lateral edges of the grid ribs on one face of the grid, a second impression member complemental with said first impression member and also having a surface thereon for defining a portion of the mold cavity which is adapted to form certain lateral edges of the grid ribs on the opposite face of the grid, a plurality of individually spaced core projections disposed in spaced apart clusters on said first impression member, each said core projection having a length sufficient to effect abutment of its end face with the cavity defining surface of said second impression member upon closure of the mold, a plurality of similar individually spaced core projections on said second impression member and disposed in a complemental pattern adapted to surround said clusters of core projections on said first impression member, each said similar core projection having a length sufficient to effect abutment of its end face with the cavity defining surface of said first impression member upon closure of the mold, all said core projections being adapted to define the interstices of said grid and being tapered away from their corresponding impression members to provide minimal draft.

EDWARD YELLIN.

REFERENCES CITED

The following references are of record in the file of this patent:

UNITED STATES PATENTS

| Number | Name | Date |
| --- | --- | --- |
| 1,482,555 | Hall | Feb. 5, 1924 |
| 1,918,532 | Geyer | July 18, 1933 |
| 2,266,887 | McCoy | Dec. 23, 1941 |
| 2,378,586 | Schultz | June 19, 1945 |